United States Patent [19]

Stewart

[11] 4,426,049
[45] Jan. 17, 1984

[54] DUAL PROPELLER AND ENGINE DRIVE SYSTEM FOR AIRCRAFT

[76] Inventor: Donald M. Stewart, 11420 State Rte. 165, Salem, Ohio 44460

[21] Appl. No.: 288,733

[22] Filed: Jul. 31, 1981

[51] Int. Cl.³ .................... B64C 11/48; B64D 27/00; B64D 35/06
[52] U.S. Cl. ...................................... 244/69; 244/54; 244/55; 244/60; 416/125; 416/170 R
[58] Field of Search ........... 416/129, 125, 128, 170 R, 416/60; 244/53 R, 54, 55, 60, 62, 65, 67, 69, DIG. 1; 248/554

[56] References Cited

U.S. PATENT DOCUMENTS

| | | | |
|---|---|---|---|
| 899,350 | 9/1908 | Steinhaus | 244/13 |
| 1,110,489 | 9/1914 | Jacobs . | |
| 1,132,368 | 3/1915 | Lorenc et al. . | |
| 1,394,870 | 10/1921 | Thomas | 416/129 |
| 1,754,737 | 4/1930 | Burks | 244/69 |
| 1,793,933 | 2/1931 | Hoffman . | |
| 3,013,749 | 12/1961 | Dunham | 244/65 |
| 3,335,979 | 8/1967 | Kurkjian | 244/65 |
| 3,470,961 | 10/1969 | Halsmer | 170/135.25 |
| 4,138,901 | 2/1979 | Fortin et al. | 416/60 |
| 4,222,280 | 9/1980 | Stewart | 474/112 |
| 4,249,711 | 2/1981 | Godbersen | 244/54 |

Primary Examiner—Trygve M. Blix
Assistant Examiner—Rodney Corl
Attorney, Agent, or Firm—Oldham, Oldham, Hudak, Weber & Sand Co.

[57] ABSTRACT

An aircraft drive system having two propellers, each of which is driven independently by a drive belt which is connected to a separate engine. The engines are mounted in cantilever fashion in a spaced relationship on a hollow sleeve. The sleeve is attached by a pair of spaced brackets to the frame of the aircraft. A shaft is rotatably telescopically mounted within the sleeve by bearings located on the ends of the sleeve. A pulley is fixedly mounted on one end of the shaft and is driven by one of the engines for rotating one of the propellers which is fixed on the other end of the shaft. Another pulley is rotatably mounted by bearings on the sleeve and is driven by a drive belt connected to the second engine. The second propeller is telescopically located about the sleeve adjacent the first propeller and is firmly connected to the second pulley which rotates said second propeller completely independent of the first propeller and in an opposite direction than the first propeller. The sleeve which is attached to the aircraft frame provides the entire support for the two drive engines, pulleys, propellers and associated drive belts.

11 Claims, 14 Drawing Figures

DUAL PROPELLER AND ENGINE DRIVE SYSTEM FOR AIRCRAFT

BACKGROUND OF THE INVENTION

1. Field of the Invention

The invention relates to aircraft and particularly to the propeller and engine drive system therefor. More particularly, the invention relates to an aircraft drive system having two propellers, each driven by a separate engine and in which all of the drive system components are mounted on a single tubular member which is attached to the aircraft frame.

2. Description of the Prior Art

It has long been known in the aeronautical field that increased aircraft performance and efficiency can be obtained by a propeller drive system having two propellers mounted in a coaxial relationship with respect to each other and rotatably driven in opposite directions. Various propeller and engine drive system arrangements have been proposed for driving such coaxially mounted propellers in opposite directions. These prior systems required expensive and special types of engines, complicated engine mounting arrangements and associated pulley drive systems, crossed belt arrangements, gears and a plurality of rotary shafts to achieve the opposite rotation of the dual propellers. These complicated prior arrangements were expensive and added additional weight and components to the aircraft which reduced the efficiency of the drive system, and increased maintenance and the possibility of malfunction. Examples of these prior art dual propeller and engine drive systems are shown in U.S. Pat. Nos. 1,110,489, 1,132,368, 1,793,933, 3,335,979, and 3,470,961.

There is no known dual engine and propeller drive system of which I am aware which mounts both engines, propellers and drive components therefor on a single fixed tubular sleeve member which is mounted on the aircraft frame, and in which the tubular sleeve member forms a support for rotatably mounting one of the propellers with the drive shaft for the other propeller being telescopically rotatably mounted within the interior of the tubular member.

SUMMARY OF THE INVENTION

Objectives of the invention include providing a drive system for aircraft having two propellers which are rotatably mounted and driven in opposite directions by two separate engines, which engines are of a usual design and are similar to each other thereby eliminating any special engine constructions or expensive drive mechanisms. Another objective is to provide such a drive system in which the engines, propellers, drive pulleys, drive belts and other components of the drive system are mounted entirely on a single hollow tubular sleeve which is mounted by brackets to the aircraft frame, thereby eliminating additional components resulting in a lighter weight and less expensive drive system than heretofore known with other dual propeller and engine drive systems.

Another objective of the invention is to provide such a drive system in which the two propellers are mounted coaxially in close proximity to each other on the tubular supporting sleeve thereby achieving more efficient propulsion, in which the drive engines are mounted in cantilever fashion on the main supporting sleeve, and in which the engines can be mounted at various positions axially and radially on the supporting sleeve to achieve various mounting arrangements in order to adapt the drive system to various aircraft frames on which the drive system is to be installed. A still further objective is to provide such a drive system which is extremely safe due to the coaxial arrangement of the propellers and symmetrical mounting of the engines in that even should one engine fail, the remaining engine would continue to fly the aircraft without any harmful imbalance or excessive vibrations. A still further objective is to provide such a drive system in which the engines are drivingly connected to the propellers by pairs of pulleys and drive belts, and in which the engines are attached to the main supporting sleeve by an eccentric mounting bracket whereby the distance between the engine shaft and propeller drive pulleys can be adjusted by the eccentric mounting bracket to achieve various propeller speeds by permitting different size drive pulleys to be used with a single drive belt.

Another objective of the invention is to provide such an aircraft drive system which is of an extremely simple construction, which eliminates maintenance and repair problems, which is formed of readily available and inexpensive components, which achieves the stated objectives in a simple, effective and inexpensive manner, and which solves problems and satisfies needs existing in the art.

These and other objectives and advantages of the invention may be obtained by the dual propeller and engine drive system for aircraft, the general nature of which may be stated as including hollow tubular sleeve means adapted to be mounted in a fixed position on a frame of an aircraft for supporting all of the components of the drive system; first and second engines mounted on the sleeve means; shaft means rotatably mounted within the sleeve means and extending coaxially with respect to said sleeve means; a first propeller mounted on an end of the shaft means for rotation with said shaft means; a second propeller rotatably mounted on the sleeve means adjacent the first propeller; first drive belt means extending between and operatively connected to the shaft means and first engine means for driving said first propeller by rotating the shaft means; and second drive belt means extending between and operatively connected to the second propeller and second engine means for rotating said second propeller independent of the first propeller and in an opposite direction.

BRIEF DESCRIPTION OF THE DRAWINGS

A preferred embodiment of the invention, illustrative of the best mode in which applicant has contemplated applying the principles, is set forth in the following description and shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
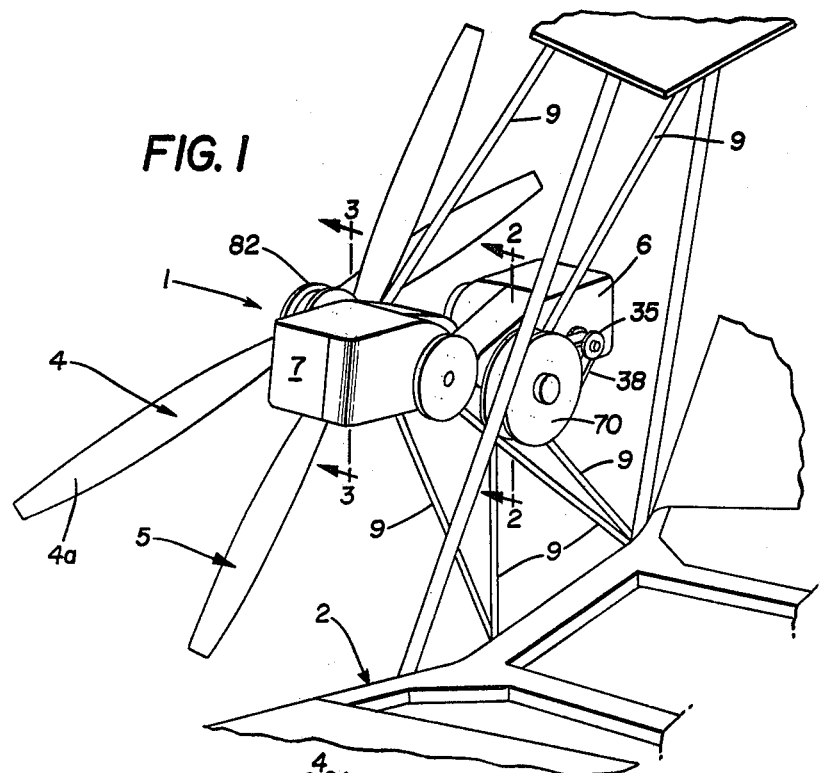
FIG. 1 is a fragmentary perspective view of the improved dual propeller and engine drive system mounted on the frame of a power-driven hang glider aircraft.
Figure 4:
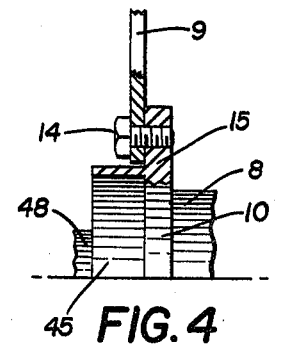
FIG. 4 is a fragmentary sectional view taken on line 4—4, FIG 2.
Figure 5:
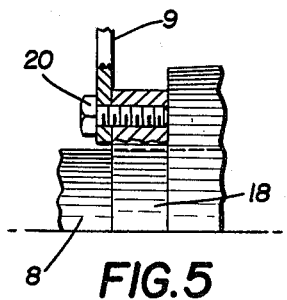
FIG. 5 is a fragmentary sectional view taken on line 5—5, FIG. 3.
Figure 2:
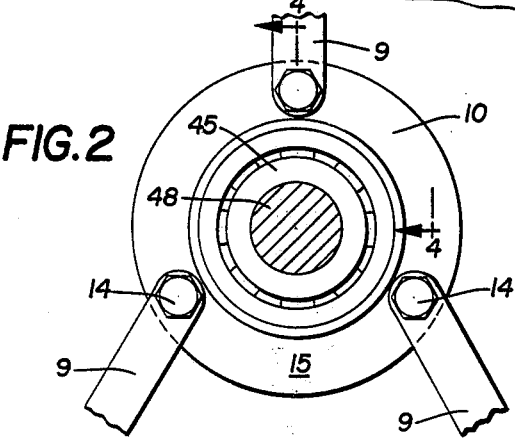
FIG. 2 is a fragmentary enlarged sectional view taken on line 2—2, FIG. 1, showing the rear mounting bracket for attaching the drive system to the aircraft frame.
Figure 3:
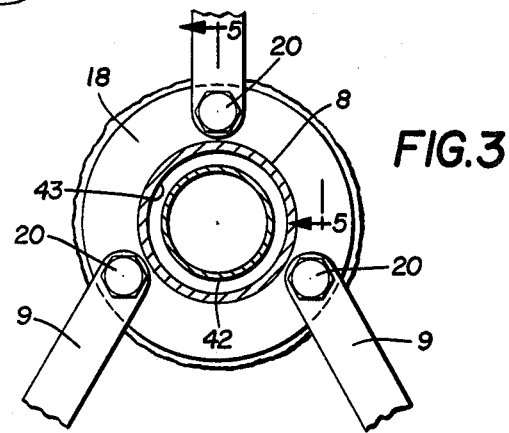
FIG. 3 is a fragmentary enlarged sectional view taken on line 3—3, FIG. 1, showing the front mounting bracket for the improved drive system.

The improved dual propeller and engine drive system is indicated generally at 1, and is shown in FIG. 1 mounted on a frame 2 of a power-driven hang glider type of aircraft. Although improved drive system 1 is shown and described as being mounted on a hang glider, the same can be used satisfactorily with various types of aircraft without departing from the concept of the invention.

Drive system 1 includes as its main components a pair of usual propellers, indicated generally at 4 and 5, which are operatively drivingly connected to a pair of engines 6 and 7, respectively. In accordance with one of the main features of the invention, propellers 4 and 5 and their respective engines 6 and 7 and the associated components thereof are supported and mounted on a longitudinally extending, hollow tubular sleeve member 8.

Figure 10:
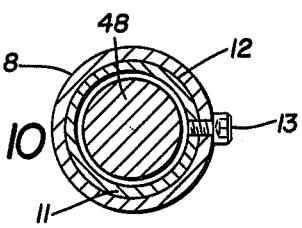
FIG. 10 is an enlarged sectional view taken on line 10—10, FIG. 7.
Figure 11:
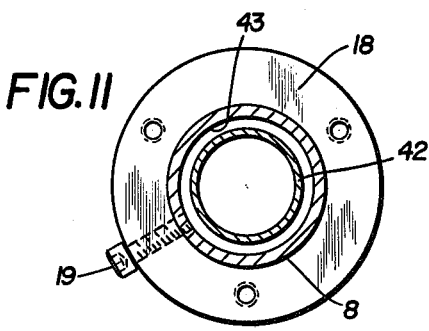
FIG. 11 is an enlarged sectional view taken on line 11—11, FIG. 7.

Sleeve 8 may be mounted on aircraft frame 2 by a variety of mounting bracket arrangements. One possible type of mounting means is by a plurality of struts 9, as shown in FIG. 1. Struts 9 are connected to a rear mounting bracket 10, as shown in FIGS. 2, 4, 7 and 9. Bracket 10 includes a cylindrical body 11, which is telescopically mounted within an open end 12 of sleeve 8 and is retained therein by a setscrew 13 (FIG. 10). The outer ends of struts 9 are attached by bolts 14 to an outer annular flange 15 of mounting bracket 10. Rear mounting bracket 10 is shown having three struts connected thereto, two of which extend downwardly toward aircraft frame 2 and one extending upwardly toward the aircraft frame where they are connected to frame 2 by appropriate fastening means (FIG. 1).

An annular ring-shaped front mounting bracket 18 (FIGS. 1, 3, 5, 7 and 11) is telescopically mounted on sleeve 8 and is secured thereto by a set bolt 19, which extends through aligned holes formed in bracket 18 and sleeve 8. A plurality of struts 9 may be connected at one end to bracket 18 by bolts 20. Three struts 9 are shown extending between bracket 18 and aircraft frame 2, two of which extend downwardly to the frame, and a third extending upwardly to the frame in a similar manner as the mounting struts for rear mounting bracket 10.

Figure 13:
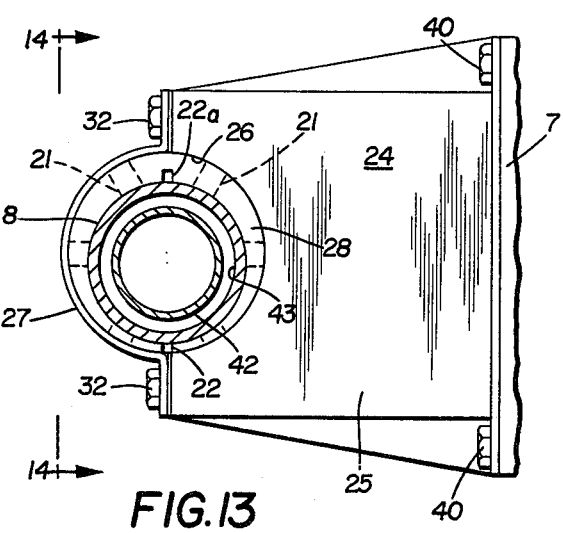
FIG. 13 is an enlarged fragmentary sectional view taken on line 13—13, FIG. 6.
Figure 14:
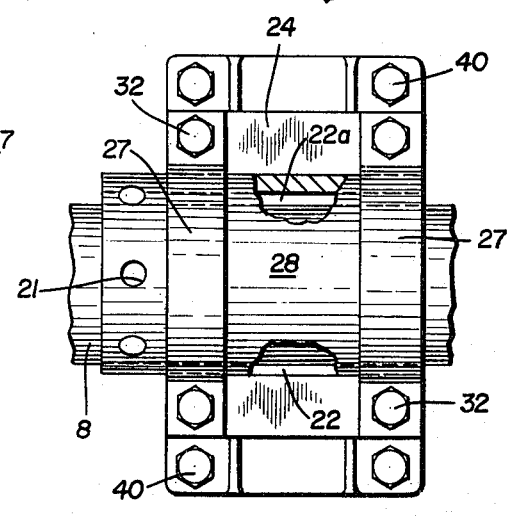
FIG. 14 is a fragmentary elevational view looking in the direction of arrows 14—14, FIG. 13.

Engines 6 and 7 are mounted in a cantilever-like arrangement in an axially spaced relationship on sleeve 8 by a pair of mounting brackets 23 and 24, respectively. In accordance with another of the features of the invention, mounting brackets 23 and 24 have an eccentric mechanism to adjust the radial distance between longitudinal axis 29 of sleeve 8 and the parallel axes 30 and 31 of the drive shafts of engines 6 and 7. This also enables various propeller speeds to be obtained without changing the associated drive belts by replacing the engine drive shaft pulleys with pulleys of different diameters. This eccentric mechanism for the engine mounting brackets is similar for both brackets 23 and 24 and, therefore, only details of the mounting bracket 24 are shown in FIGS. 13 and 14 and described below.

Figure 6:
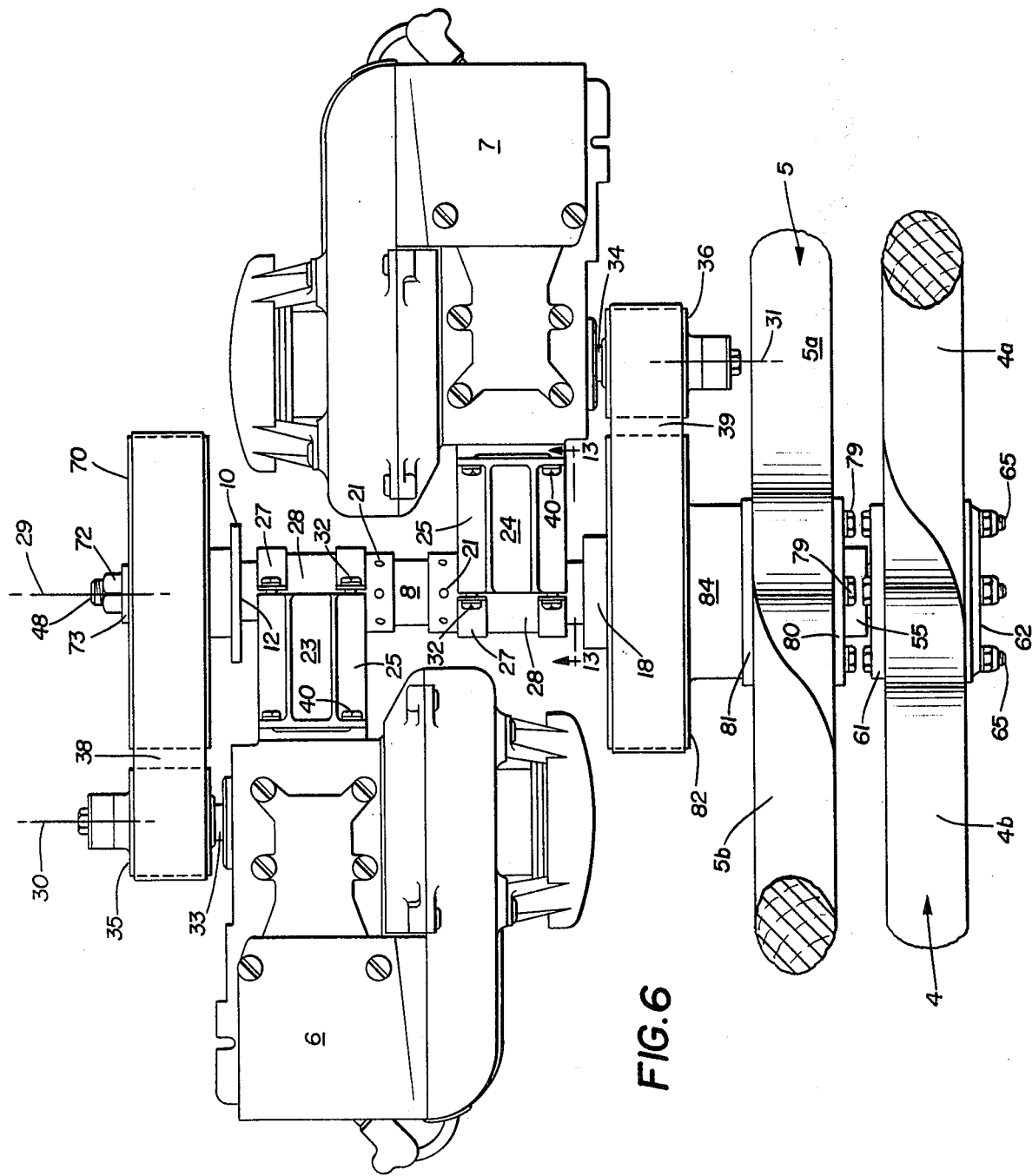
FIG. 6 is a top plan view of the improved drive system removed from the aircraft frame with only a portion of the dual propellers being shown.

Bracket 24 includes a saddle block 25 which is mounted on engine 7 by bolts 40. Block 25 is formed with a semicylindrical recess 26 and a pair of inverted U-shaped clamps 27. Clamps 27 are attached by bolts 32 to the outer end of block 25 to form a somewhat cylindrical opening therebetween. A hollow sleeve 28 having an eccentric wall thickness if telescopically mounted on sleeve 8 and clamped thereon by bracket 25 and clamps 27 within semicylindrical opening 26 of bracket 25. A plurality of holes 21 are formed in sleeve 28 for engagement by a spanner wrench for rotating the sleeve. Sleeve 28 is formed with a longitudinally extending split 22 and an internal groove 22a so that sleeve 28 will be clamped securely about sleeve 8 by clamps 27. The rotational position of eccentric sleeve 28 on the sleeve 8 will determine the radial spacing between axis 29 of sleeve 8 and engine drive shaft axis 31 (FIG. 6).

Engines 6 and 7 preferably are usual internal combustion gasoline-driven engines and, in accordance with one of the advantages of the invention, are identical to each other. This eliminates the need for specially designed engines for the satisfactory operation of drive system 1, as in some prior art dual propeller drive systems. Engines 6 and 7 have usual drive shafts 33 and 34 and drive pulleys 35 and 36, respectively, are mounted on the extended ends thereof. Drive shaft 33 of engine 6 extends rearwardly from the propellers toward the aircraft frame, and drive shaft 34 of engine 7 extends outwardly forwardly toward the propellers. Shafts 33 and 34 are parallel to each other and to axis 29 of sleeve 8. Drive belts 38 and 39 are mounted on drive pulleys 35 and 36 respectively, for rotating propellers 4 and 5 as described below.

In accordance with the invention, an inner shaft, indicated generally at 42, extends coaxially within the hollow interior 43 of sleeve 8 and is rotatably mounted therein by a pair of spaced front and rear bearings 44 and 45. Shaft 42 includes a hollow tubular central portion 46 and a pair of solid stepped cylindrical front and rear end plugs 47 and 48. End plugs 47 and 48 have countersinks 49 and 50 extending partially into the body of the plugs. End plugs 47 and 48 are telescopically received within the open ends of tubular central portion 46 and secured therein by welds 51.

Figure 7:
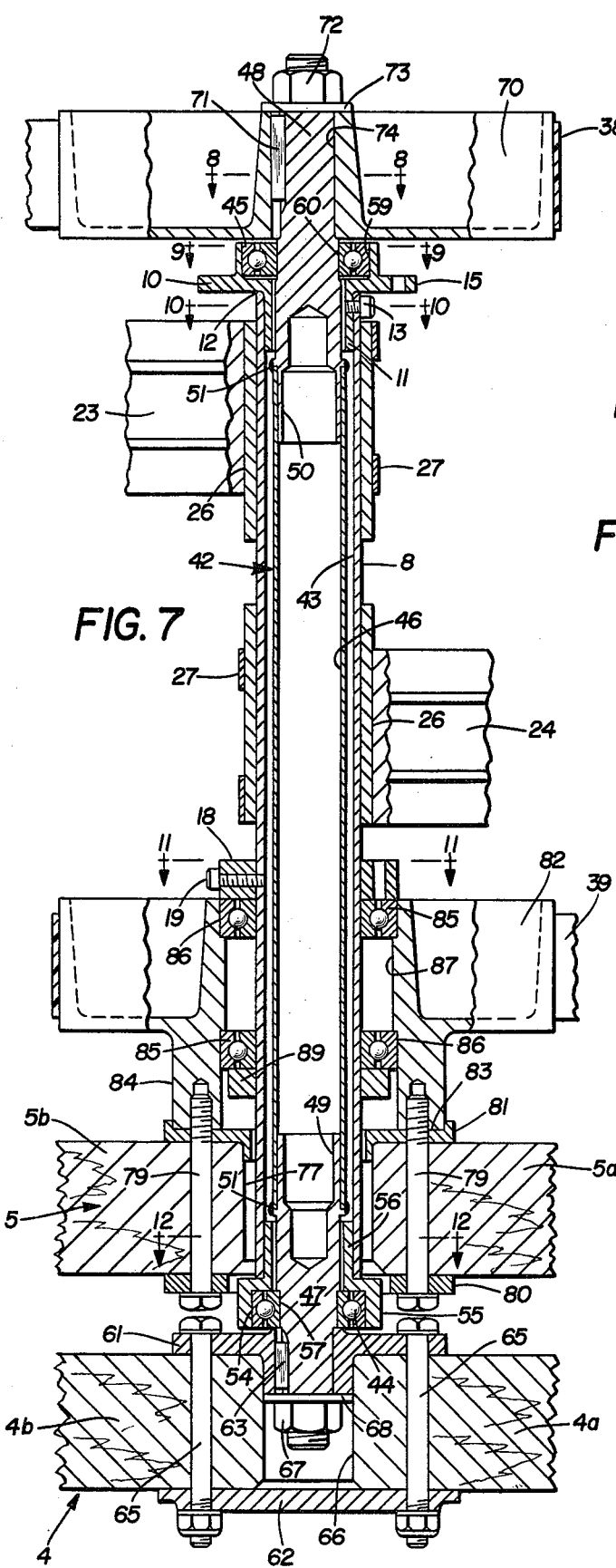
FIG. 7 is an enlarged fragmentary longitudinal sectional view of the drive system shown in FIG. 6.
Figure 12:
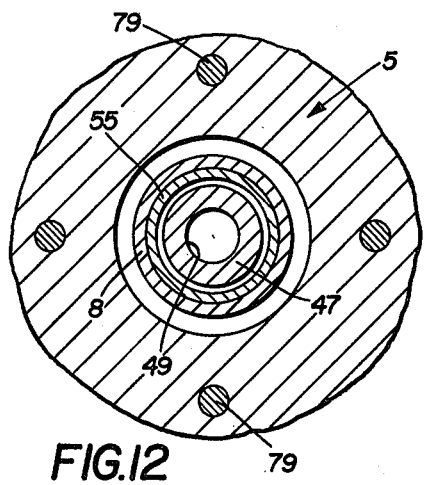
FIG. 12 is an enlarged fragmentary sectional view taken on line 12—12, FIG. 7.

Front shaft mounting bearing 44 is mounted within an annular recess 54 formed in an end cap 55 (FIGS. 7 and 12). Cap 55 includes a cylindrical body 56 which is telescopically mounted within the open end of tubular sleeve 8. The inner race of bearing 44 is telescopically mounted on a stepped cylindrical surface 57 of solid end plug 47 for rotatably mounting shaft 42 within sleeve 8.

The inner end of shaft 42 is rotatably mounted by a bearing 45 which is seated within an annular recess 59 of rear mounting bracket 10. The inner bearing race is telescopically mounted on a stepped cylindrical surface 60 of solid end plug 48. Thus, inner shaft 42 is rotatably mounted within bore 43 of fixed sleeve 8 by front and rear bearing rings 44 and 45, respectively.

Propeller 4 is formed with a central opening 66 and includes a pair of blades 4a and 4b. Propeller 4 is secured between inner and outer clamping plates 61 and 62 by bolts 65 and is mounted on the outer end of rotatable shaft 42 by inner clamping plate 61 which is telescopically mounted on a reduced cylindrical outer surface of end plug 47. Plate 61 is fixedly mounted on shaft 42 by a key-keyway connection 63. A nut 67 and washer 68 clamp propeller 4 in position on shaft end 47 and clamps bearing 44 within end cap 55. Nut 67 also clamps end cap 55 tightly against the outer edge of sleeve 8 to secure cap 55 in a fixed position on sleeve 8.

Figure 8:
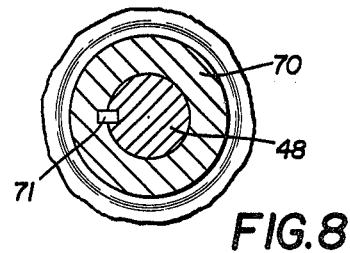
FIG. 8 is an enlarged fragmentary sectional view taken on line 8—8, FIG. 7.
Figure 9:
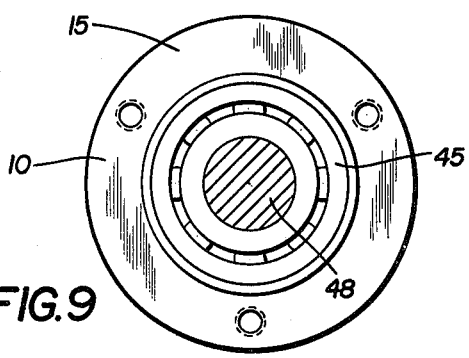
FIG. 9 is an enlarged sectional view taken on line 9—9, FIG. 7.

Shaft 42 and propeller 4 are rotated by a driven pulley 70 which is mounted on plug end 48 of inner shaft 42 by a key-keyway connection 71 (FIGS. 7 and 8). Pulley 70 has a bore 74 which is telescopically mounted on an outer cylindrical stepped surface of plug end 48. Pulley 70 is clamped in position on shaft end 48 by a nut 72 and associated washer 73. Drive belt 38 extends between and drivingly connects driven pulley 70 with drive pulley 35 which is mounted on engine drive shaft 33 of engine 6. Thus, with the above-described mounting arrangement, engine 6 will drive propeller 4 through drive pulley 35, drive belt 38 and driven pulley 70. Pulley 70 is fixedly mounted on the rear end of rotatable inner shaft 42, which is rotatably mounted within and extends coaxially through fixed outer sleeve 8, with propeller 4 being fixedly mounted on the outer end of shaft end 47.

Inboard propeller 5 is a usual propeller formed with a central opening 77 and has a pair of individual propeller blades 5a and 5b (FIGS. 7 and 12). Propeller 5 is mounted between a pair of clamping plates 80 and 81 by bolts 79. The inner threaded ends of bolts 79 are engaged within threaded openings formed in an outer annular edge 83 of a cylindrical hub 84 of a driven pulley 82. Bolts 79 clamp plates 80 and 81 and propeller 5 tightly against this outer annular edge 83 of pulley hub 84 whereby pulley 82 and propeller 5 rotate in unison on sleeve 8. Pulley 82 is rotatably mounted on the outer surface of fixed sleeve 8 by a pair of spaced bearing rings 85 which are telescopically mounted on sleeve 8 and seated against a pair of annular shoulders 86 formed in the inner bore 87 of driven pulley 82. Bearings 85 are clamped within pulley bore 87 by assembly mounting bracket 18 and a bearing retaining ring 89 which is secured on sleeve 8 against bearing 85 to maintain bearing 85 against shoulder 86.

Drive belt 39 extends between and drivingly connects driven pulley 82 with drive pulley 36 which is mounted on drive shaft 34 of engine 7. Thus, inboard propeller 5 is rotatably mounted on fixed sleeve 8 by bearings 85 and is driven by pulley 82 which is fixed to propeller 5 by drive belt 39 which is drivingly connected to engine 7. The outer end of sleeve 8 extends through central opening 77 of propeller 5 and through aligned openings formed in clamping plates 80 and 81.

Thus, in accordance with one of the main features of the improved drive system, propellers 4 and 5 are supported entirely by outer sleeve 8, yet are driven completely independently of each other in opposite directions by their respective engines. Engines 6 and 7 are mounted in a spaced axial relationship along sleeve 8 and are positioned whereby their drive shafts extend in opposite directions with respect to each other and are parallel to longitudinal axis 29 of sleeve 8 in order to achieve opposite rotation of the propellers 4 and 5. Another advantage of the improved drive system is that propellers 4 and 5 are both mounted at the extended ends of their respective drive mountings in close proximity to each other. Such mounting is in contrast to the more complicated and less efficient prior art drive assemblies wherein the propellers must be mounted a considerable distance apart to provide sufficient spacing for attaching the drive means to the propeller shaft to achieve the opposite rotational drive.

Another advantage of the improved drive system is the ease in which the speed of the propellers can be changed due to the eccentric mounting of the engines on sleeve 8 by mounting brackets 23 and 24. Loosening of U-shaped clamp bolts 32 enables eccentric sleeve 28 to be rotated on saddle block 25 which moves the respective engine drive shaft closer or farther from axis 29 of sleeve 8. The diameter of the engine drive pulley 35 or 36 then can be changed to achieve a greater or lesser rotational speed with the original drive belt 38 or 39 being reattached thereto, which provides a different rotational speed to the propellers. This eccentric mounting also provides an extremely easy means of adjusting the tension in the drive belt and compensates for minor misalignments between the engines and driven pulleys. Another advantage is that engines 6 and 7 can be adjusted rotationally about sleeve 8 to various positions without affecting the operation of the drive system. This enables the drive system to be compatible with various aircraft having different frame constructions so that the engines can be placed so as to be unaffected by the frame and to provide adequate clearance therebetween.

Still another advantage of the improved drive system is that, should one of the engines fail, the other engine will continue to operate and drive its respective propeller, completely unaffected by the stopping of the other engine and propeller without unbalancing the drive system. Also, since the engines are the same, it will reduce the inventory of spare engines and parts therefor since no duplication is required. Also, the most important advantage of the improved drive system is the mounting of all of the drive system components on a single elongated member which is attached by struts or other bracket means to the aircraft frame. This enables the drive assembly to be fabricated and stored as a complete unit and conveniently mounted directly on various types of aircraft frames by providing simple mounting bracket connections therefor without expensive and complicated modifications to the frame of the aircraft.

Throughout the above description and as shown in the drawings, the drive and driven members are pulleys and endless flexible belts. It is readily understood that the scope of the invention and interpretation of the claims need not be limited to such components since the drive connecting means can be chains, gears, sprockets and similar components. Also, the engines can be turbines or other types of prime movers.

Accordingly, the improved drive system is simplified, provides an effective, safe, inexpensive, and efficient device which achieves all the enumerated objectives, provides for eliminating difficulties encountered with prior drive systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the dual propeller and engine drive system for aircraft is constructed and used, the characteristics of the construction, and the advantageous, new and useful results obtained, the new and useful structures, devices, elements, arrangements, parts, and combinations are set forth in the appended claims.

I claim:
1. A drive system for an aircraft including:
   (a) elongated longitudinally extending support means adapted to be mounted on a frame of an aircraft for operatively supporting all of the components of the drive system thereon, said support means including a fixed outer sleeve and an inner shaft rotatably mounted within said outer sleeve, said outer sleeve and inner shaft each having an extended end;
   (b) first and second propellers, said first propeller being rotatably mounted on the extended end of the fixed outer sleeve and said second propeller being mounted on the extended end of the shaft in close proximity to said first propeller;
   (c) first and second engines;
   (d) bracket means for mounting the first and second engines on the support means;
   (e) drive means mounted on the support means and operatively connected to each of the engines and respective propellers for drivingly connecting each of the propellers with its respective engine to rotate said propellers in opposite directions with respect to each other; and
   (f) means for mounting the elongated support means on the frame of an aircraft.

2. The drive system defined in claim 1 in which the first and second engines are adjustably mounted on the fixed outer sleeve by the bracket means for selectively changing the rotational speed of the respective propellers driven thereby by changing the radial spacing between the axis of the sleeve and the axes of the engines.

3. The drive system defined in claim 2 in which the bracket means includes a pair of eccentric brackets for changing the radial spacing between the axis of the sleeve and the axes of the engines for changing the propeller speeds.

4. The drive system defined in claim 1 in which the engine bracket means mounts the engines in a spaced axial relationship on the fixed outer sleeve and in which said engines extend in cantilever fashion outwardly from said sleeve.

5. The drive system defined in claim 1 in which the fixed outer sleeve has a pair of open ends; and in which bearing means is mounted adjacent each of the open ends of the sleeve for rotatably mounting said shaft coaxially within the sleeve.

6. The drive system defined in claim 1 in which the first and second engines are similar to each other and are mounted at diametrically opposite positions with respect to the fixed outer sleeve; in which each of the engines includes a drive shaft; and in which the engine drive shafts extend in opposite directions with respect to each other and parallel to the longitudinal axis of the sleeve.

7. The drive system defined in claim 1 in which the drive means includes a pair of pulleys and an endless belt extending therebetween for each of the propellers and engines; in which one of the pulleys is rotatably mounted on the fixed outer sleeve and is connected to the first propeller which is telescopically rotatably mounted on said outer sleeve; and in which the other of the pulleys is fixed to the inner shaft for rotating said inner shaft.

8. The drive system defined in claim 1 in which the first propeller is formed with a central opening; in which the shaft extends through the first propeller central opening; and in which the second propeller is mounted on the extended end of the shaft outboard of and in close proximity with the first propeller.

9. The drive system defined in claim 1 in which each of the engines has a drive shaft which extends parallel with and is spaced from the longitudinal axis of the support means; and in which the engine mounting bracket means includes a pair of eccentric mechanisms for adjusting the spacing between the axes of the engine drive shafts and the longitudinal axis of the support means to permit adjustments in the rotational speed of the propellers.

10. The drive system defined in claim 1 in which the mounting means for the elongated support means includes a pair of brackets mounted in a spaced axial relationship on the fixed outer sleeve.

11. The drive system defined in claim 10 in which the mounting means brackets include annular collars telescopically mounted on and secured to the fixed outer sleeve.

* * * * *